United States Patent [19]

Block

[11] 4,025,212
[45] May 24, 1977

[54] CAN CONSTRUCTION DEVICE AND SYSTEM

[76] Inventor: Alvin W. Block, 4449 Palma, Skokie, Ill. 60076

[22] Filed: Jan. 15, 1976

[21] Appl. No.: 649,426

[52] U.S. Cl. .................................. 403/361; 46/11; 52/726; 206/509; 211/188; 52/DIG. 9
[51] Int. Cl.² ........................................ B25G 3/02
[58] Field of Search ....................... 248/159, 188.4; 403/361, 118, 343; 206/508, 509; 46/11; 52/726, DIG. 9; 211/188, 194

[56] References Cited

UNITED STATES PATENTS

| | | | |
|---|---|---|---|
| 1,320,823 | 11/1919 | Astruck | 248/159 |
| 1,401,057 | 12/1921 | Elliott | 248/159 X |
| 3,317,087 | 5/1967 | Landis | 285/235 X |
| 3,751,082 | 8/1973 | Somerville | 248/159 X |
| 3,815,281 | 6/1974 | Kander | 206/509 X |

Primary Examiner—Wayne L. Shedd
Attorney, Agent, or Firm—Leydig, Voit, Osann, Mayer & Holt, Ltd.

[57] ABSTRACT

A device and system for use with a plurality of the same in constructing objects from empty beverage cans which device includes a disk adapted to be received in the cavity between the recessed end members of two abutting axially aligned beverage cans to maintain the alignment thereof. A threaded member projects from one side of the disk and a spindle projects from the other side. The outer end of the spindle is provided with a threaded bore adapted to receive the threaded member from another such device. The spindle passes down through an opening in the top end of the can, while the threaded member of another device passes up through an opening in the bottom of the can. The threaded member threads into the spindle disposed therein to "sandwich" the can between two disks and provide a threaded member and spindle with which to continue the process. In this manner, a series of cans with the devices disposed therein may then be connected, either directly or through a shelf member. Caps having an internal bore can be used to terminate one end of a series of cans, while a plain disk having a threaded member projecting therefrom may be used to terminate the other end of the series.

14 Claims, 10 Drawing Figures

U.S. Patent   May 24, 1977   Sheet 1 of 2   4,025,212
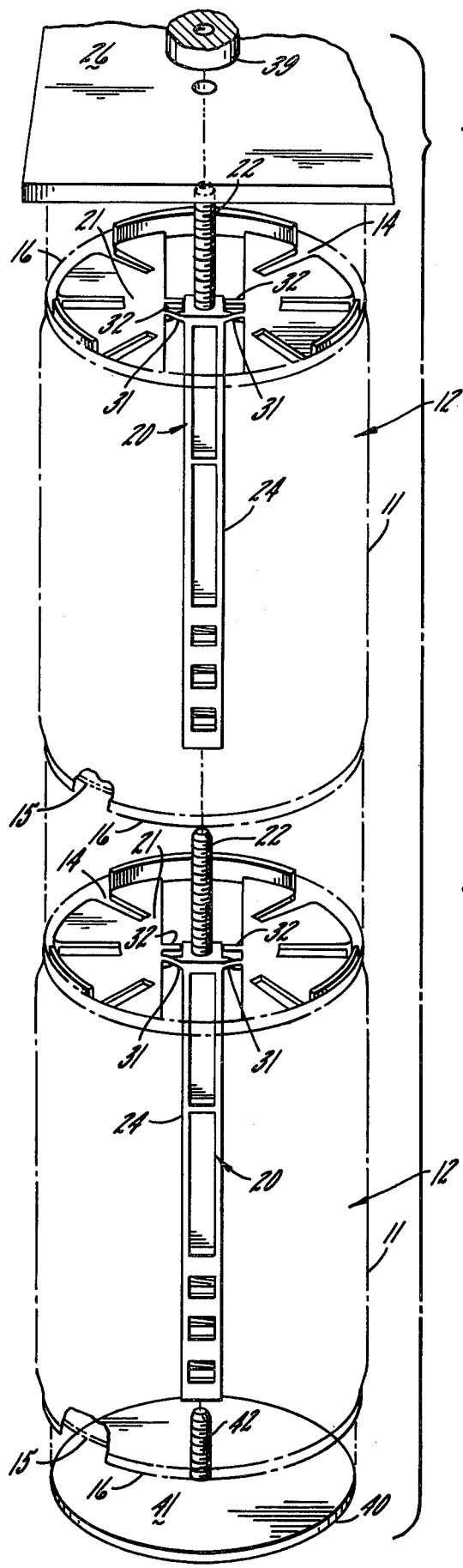
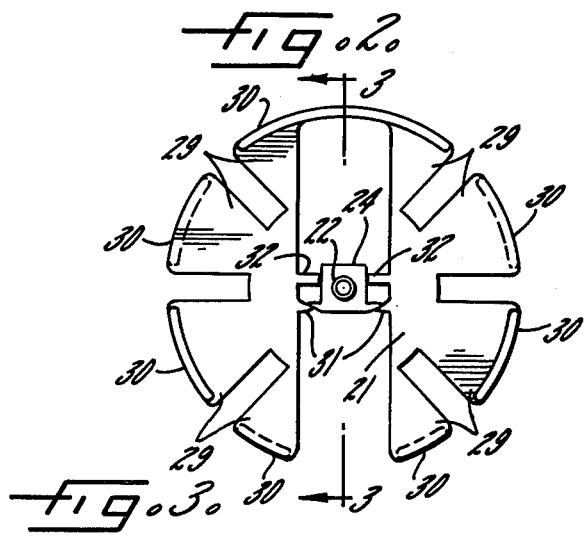
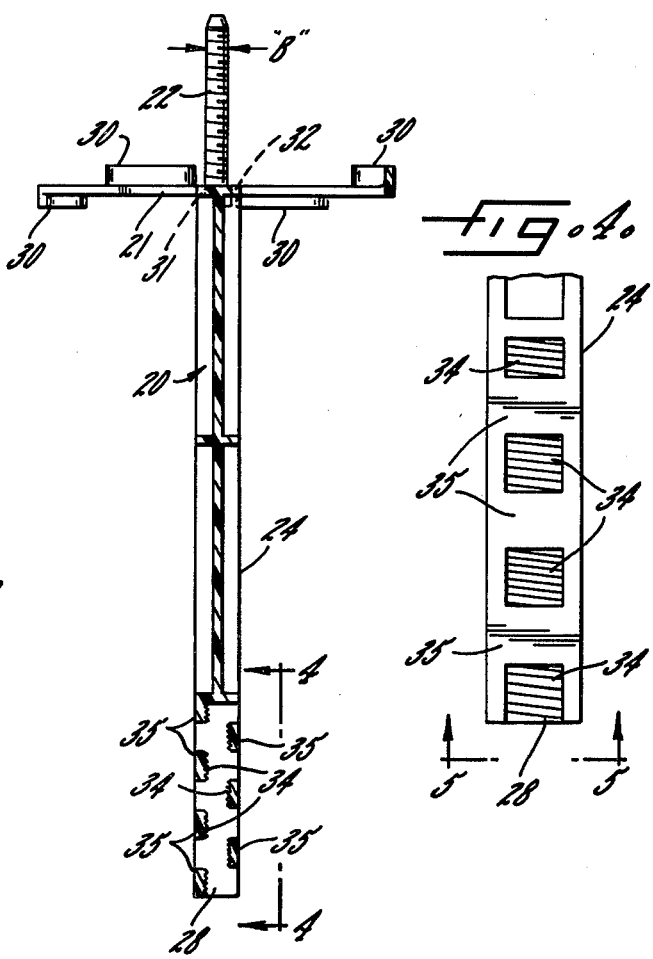

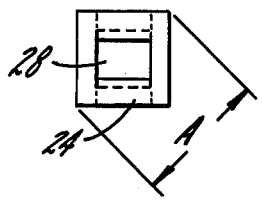
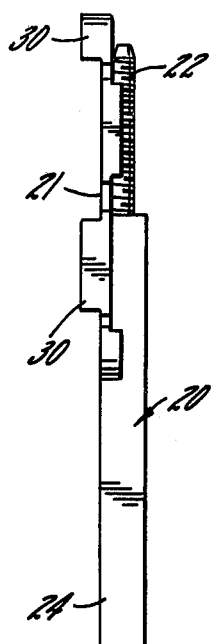
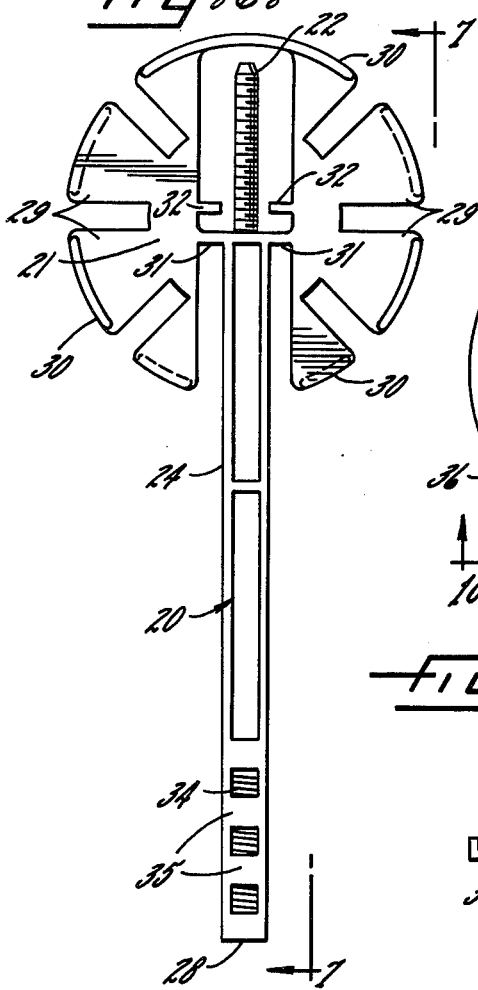
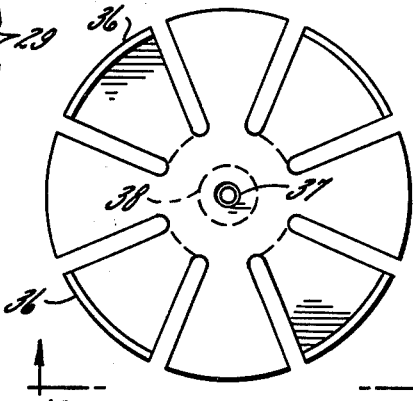
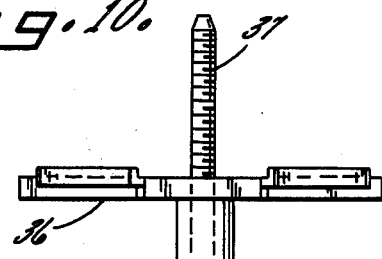
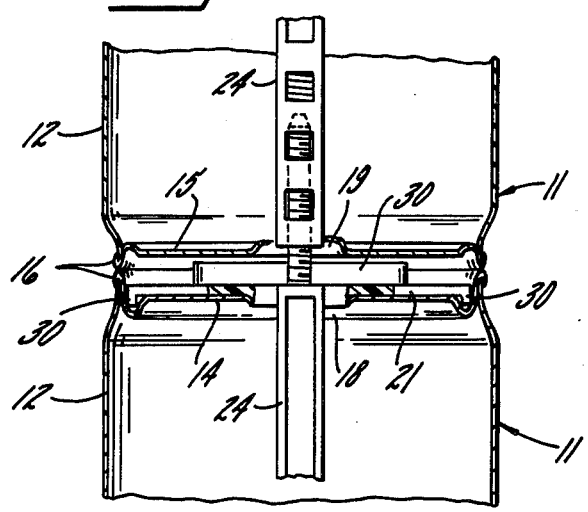

CAN CONSTRUCTION DEVICE AND SYSTEM

BACKGROUND OF THE INVENTION

It has been known to fabricate low cost, demountable shelf units from boards or planks spaced apart from one another by a variety of items, including bricks, cinder blocks and even empty disposable beverage cans. The former two offer a high degree of structural integrity but tend to be bulky, abrasive, difficult to transport and expensive. Empty, disposable beverage cans offer the advantages of being inexpensive, readily obtainable, and easily transported. Achievement of satisfactory structural integrity, however, is difficult with conventional fabricating techniques such as gluing and taping the cans together. This is due primarily to the fact that the mass and diameter of the cans are too small to offer sufficient resistance to lateral forces notwithstanding the integrity of the cans themselves and the accuracy with which they are made. Cans present further difficulties in that while they rest squarely on flat surfaces, the chimes present on at least one end and in some cases on both ends prevent stable stacking as is often desired to achieve spacing between the shelves greater than the height of a single can. U.S. Pat. No. 3,751,082 discloses devices which snap fit over adjoining chimes to permit stacking of a plurality of cans. While the patent may offer a way to stack cans directly adjacent one another and make different constructions, the possible lack of structural integrity due to the small diameter and mass of the cans would not readily lead to a sturdy shelf-supporting construction or the like.

In terms of aesthetics, such known systems for can construction would also have the disadvantage of exposed can connecting elements. Such exposure would detract from any design compatibliity and aesthetic effect of the construction. In terms of manufacturing and marketing, it would be an advantage to be able to produce and sell a single, low cost, universally acceptable item with minimal emphasis on the aesthetic impact of the device on the structures to be fabricated.

Accordingly, it is an object of the present invention to provide a can construction device which is relatively simple, lost cost and can be installed with a minimum of readily "on hand" tools.

A further object of the present invention is to provide a can construction device with which a shelf unit of relatively high structural integrity may be quickly and easily constructed from empty beverage cans and boards or planks.

Still another object of the present invention is to provide a can construction device which when installed is largely concealed thereby eliminating the need to assure design compatibility and color coordination of the device with the other components of the shelf unit.

Still another object of the present invention is to provide a can construction device which may be molded in one piece with a simple, two-piece die.

Other objects and advantages of the invention will become apparent as the following description proceeds, taken in conjunction with the accompanying drawings, in which:

FIG. 1 shows two can construction devices in conjunction with two cans, a shelf, a top cap and a bottom cap aligned for assembly;

FIG. 2 is a plan view of a can construction device according to the present invention;

FIG. 3 is a sectional view of a can construction device taken along line 3—3 of FIG. 2;

FIG. 4 is a side view of the internally threaded portion of the spindle of the can construction device shown in FIG. 3;

FIG. 5 is a bottom view of the internally threaded portion of the spindle shown in FIG. 4;

FIG. 6 is an elevational view of the can construction device of FIGS. 1 through 5 after molding;

FIG. 7 is a side view of the can construction device illustrated in FIG. 6;

FIG. 8 is a partial view of two can construction devices connecting two cans;

FIG. 9 is a plan view of a disk portion of a can construction device according to a second embodiment of the invention; and FIG. 10 is an elevational view, partially in section, of the can construction device illustrated in FIG. 9.

While the invention is susceptible of various modifications and alternative forms, certain embodiments thereof have been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention.

Referring now to the drawings, and particularly to FIG. 1, there are illustrated two beverage cans 11 of conventional manufacture. As best illustrated in FIG. 8, each of the cans is comprised of a cylindrical sidewall 12, a top and bottom substantially disk shaped end member 14 and 15, respectively, and a curled seam or chime 16 at the annular intersections of said end members with said cylindrical member. To accommodate the present invention, openings are made at the centers of the top and bottom disk members. The precise sizes of the openings is not critical, allowing the openings to be generated by simple puncture devices. The minimum standards for the size and shape of the openings are determined by the dimensions of the can construction device. The opening 18 in the top disk member 14 must be at least as large as the "A dimension" of the spindle as shown in FIG. 5. If the can is of the "pop open" variety, the opening generated by removing the tab may be large enough without further alteration. The opening 19 of the bottom disk member 15 must be of a diameter at least equal to that of the threaded projection. See the "B dimension" of FIG. 3.

According to the present invention and as shown in FIG. 1, a can construction device 20 is inserted from the top into each of the cans 11 shown in FIG. 1. For the purpose of maintaining axial alignment between two adjacent cans the can construction device 20 comprises a substantially disk shaped member 21, the outside diameter of which is slightly less than the inside diameter of the chimes of the cans. See FIG. 8. Providing means for interconnecting a series of cans and optionally interpositioned shelves are an upwardly extending externally threaded projection 22 and a downwardly extending spindle 24 the lower end of which is internally threaded. It will be appreciated that the length of the threaded projection is determined by the thickness of the shelves 26 to be used and by the minimum engagement between the threaded projection 22 and the threaded bore 28 of the spindle 24 required for secure fastening. The required engagement will be dependent upon the materials from which the can construction devices 20 are made. For example, with a threaded metal rod serving as the threaded projection 22 and a threaded metal insert providing the threaded bore 28 of the spindle 24, the amount of the threaded engagement need not be as great as would be the case if, for example, the threaded projection 22 and the threaded bore 28 were both molded from a plastic material. The spindle 24 should be long enough to extend into the can 11 to a point just above the upper surface of the bottom end member 15 of the can. With this arrangement it will be assured that the adjacent chimes 16 of two stacked cans 11 will seat squarely against one another, or, if a shelf 26 is interpositioned between two cans, the chimes 16 of the cans 11 will seat squarely upon the shelf. It will be appreciated that the threaded bore 28 should be long enough to accommodate the entire threaded projection 22 in the event cans are connected directly without the interposition of a shelf member between them.

According to another aspect of the present invention and for the dual purposes of (1) accommodating cans having domed end members 14 and 15 and (2) allowing the upper chime 16 of a can to seat squarely against a superjacent shelf 26, the disk member is divided into segments 29. See FIG. 2. The segments have alternate upstanding and depending ribs 30 at their outer edges. These ribs increase the effective thickness of the disk 21 at its periphery while leaving the center portion of the disk thin to allow adjacent chimes to seat even with the domed end members. Further, when the disk member 21 is between a shelf member 26 and an end member 14 or 15 of a can, the segments 29 with upstanding ribs 30 flex downward allowing the chime 16 of the can to seat squarely against the shelf. In order to serve the above described purposes it will be appreciated that any number of segments 29 can be used. In the embodiments shown in the drawings, the disk has been divided into eight segments.

It should be noted that regardless of whether the disk members are between two cans 11 or between a shelf member 26 and a can 11, no portion of the can construction device 20 is visible. This permits the design of the devices to be wholly functional. In addition, by concealing the can construction devices and thereby eliminating the need for color coordination with the fabricated structure, the manufacturing cost may be minimized by permitting single color production.

For the purpose of further reducing the manufacturing cost of the can construction devices, the embodiment illustrated in FIGS. 1 through 8 is adapted to permit unitary molding in a simple, two-piece die. FIGS. 6 and 7 are front and side views, respectively, of the can construction device 20 hereinabove described after molding. As illustrated in the figures, the disk member 21 is molded in a plane parallel to the axis of the spindle 24 and threaded projection 22. (It will be appreciated that this arrangement has the further advantages of minimizing the bulk in shipping and eliminating an assembly step which would be required with a two-piece construction). Two pliable connecting members 31 connect two semicircular segments comprising the disk member 21 to the spindle 24. The upstanding rib 30 associated with the uppermost (as viewed in FIG. 2) segment 29 of each of the two semicircular segments connects therebetween to maintain a coplanar relationship between the semicircular segments. These pliable members 31 permit the disk member 21 to be rotated with respect to the spindle 24 and the threaded projection 22 about the axis defined by the members 31 themselves. Two seating members 32 extend substantially radially inward from the semicircular segments to guide the disk member as it is rotated and to maintain a concentric relationship between the disk member and the axis of the spindle and threaded projection.

In keeping with the objective of permitting the can construction device 20 to be molded with a simple, two-piece die, the internal threads 28 at the lower portion of the spindle 24 are formed by molding inclined ridges 31 in a series of cross members 35 at the lower portion of the spindle 24. The ridges 34 are spaced apart and pitched with respect to the axis of the spindle to correspond to the specifications of a conventional, helical thread. The "threads" provided in this manner serve the function of receiving the threaded projection 22 from a second can construction device 20 while eliminating the need for either using a removable core die or requiring a thread cutting operation after the molding operation.

Molding the can construction device in more than one piece may be desirable in some instances. FIGS. 9 and 10 illustrate a multiple piece embodiment of the invention. A disk member 36 has a hole in the center through which a threaded member 37 passes. The lower end of the threaded member attaches to spindle 38, which may be a rod adapted at its upper end to support the disk member and receive the threaded member and threaded at its lower end to receive the threaded member of another such device. The overall installation and functioning of the device remains the same regardless of whether a one-piece or a two-piece fabrication technique is employed.

As shown in FIG. 1, a top cap 39 and a bottom cap 40 may be employed to terminate the respective ends of a series of cans and shelf members. The top cap 39 has an internal thread compatible with the external thread of the threaded projection 22 of the can construction devices. As the top cap 39 will be exposed, it may be desirable to employ a decorative design. With regard to the bottom cap 40, it may be formed from a plain disk 41 having an upstanding, concentric threaded projection 42 adapted to thread through the bottom end member of the last can of the series into the lower end of the spindle 24 of the can construction device 20 therein. The disk 41 should have a diameter at least equal to that of a chime 16 of a can 11 to assure that the end cap bears squarely against the can to securely retain the can construction device within the can. The lower surface of the bottom cap 40 may be provided with a non-marring, non-skid material to protect the surface upon which the structure is built and to provide additional stability for the structure.

The above description has been directed specifically at a device designed specifically for use with cans having chimes at both ends. It will be appreciated, however, that the device may be readily adapted for use with any can having recesses in the end members to provide surfaces to center the cans with respect to the device and consequently with respect to one another.

I claim as my invention:

1. An article of manufacture for connecting empty cans having a cylindrical side wall, recessed end members and chimes at the annular intersections thereof, said article comprising:

a disk-shaped member received in the end cavity between the chimes and recessed end members of two abutting axially aligned cans, said disk-shaped member having an outside diameter slightly less than the inside diameter of said chimes such that the outer periphery of said disk-shaped member serves to align abutting cans;

a threaded member projecting perpendicularly from one side of said disk; and a spindle projecting perpendicularly from the other side of said disk, the outer end of said spindle having means defining a threaded longitudinally extending bore receiving the threaded member from a second such article such that a series of cans are connected by progressively inserting the spindle of a first said article through an opening in one end member of a can and threading the threaded member of a second said article into the first spindle an opening in the other end member of the can.

2. An article of manufacture as set forth in claim 1 wherein said disk-shaped member is axially compressible, the thickness of said member in its uncompressed condition being less than the spacing between the recessed end members of abutting, axially aligned cans but greater than the spacing between a recessed end member of a can and the plane defined by the end of the can, the thickness of said member in its compressed condition being no greater than the spacing between a recessed end member of a cylindrical can and the plane defined by the end of the cans.

3. An article of manufacture for connecting empty beverage cans having recessed end members, said article comprising:

a disk-shaped member received in the cavity between the recessed end members of two abutting, axially aligned cans, said member having an outside diameter slightly less than the inside diameter of said cavity such that the outer periphery of said disk-shaped member serves to align abutting cans;

a threaded projection extending from one side along the axis of said disk-shaped member;

a spindle extending from the other side along the axis of said disk-shaped member, the outer end of said spindle engagingly receiving the threaded projection from a second article as said spindle extends downward through an opening in one end of one can and the threaded projection from said second article extends upward through an opening in the other end of said can.

4. An article as set forth in claim 3 wherein the disk-shaped member is axially compressible to permit a shelf member to seat squarely on the end of an abutting can.

5. An article as set forth in claim 3 wherein said disk-shaped member is comprised of segments internally connected and having their peripheral edges axially movable relative to one another, said segments having alternately upstanding and depending ribs to engage the inside surfaces of the recessed end members of abutting, axially aligned cans.

6. An article as set forth in claim 3 wherein said adaptation of said spindle to receive said threaded projection comprises a series of ridged cross members in said spindle, said ridges being spaced apart from one another and inclined with respect to the axis of said spindle to form threads to receive said threaded projection, said series of ridged cross members being molded with a conventional two-piece die.

7. An article as set forth in claim 3 wherein said disk-shaped member is flexibly connected to said spindle by ribs to permit the molding of said disk-shaped member in a plane parallel to the axis of said spindles and said disk-shaped member being rotatable to the position perpendicular to said spindle.

8. A system for constructing shelf units from shelves and empty beverage cans having side walls, recessed end members and chimes at the intersections thereof, said system comprising:

a can construction device comprising a disk-shaped member received in the cavity formed between the end members of abutting cans, said disk-shaped member having an outside diameter slightly less than the inside diameter of said chimes such that the outer periphery of said disk-shaped member serves to align abutting cans; a threaded projection extending from one side along the axis of said disk-shaped member; a spindle extending from the other side along the axis of said disk-shaped member, the outer end of said spindle engageably receiving the threaded projection from a second article as said spindle extends downward through an opening in one end member of one can and the threaded projection from said second article extends upward through an opening in the other end member of said can;

a top cap threaded onto the threaded projection terminating one end of a series of connected cans and interpositioned shelves; and a bottom cap thread threaded onto the spindle within the can terminating the other end of a series of connected cans and interpositioned shelves.

9. A system as set forth in claim 8 wherein said bottom cap comprises a disk-shaped member and a concentric, threaded projection extending from one side thereof and threaded into the lower end of a spindle of a can construction device.

10. A system as set forth in claim 9 wherein said disk-shaped member of said bottom cap has a diameter at least equal to the diameter of the can terminating the series.

11. A system as set forth in claim 8 wherein said bottom cap has a non-marring and non-skid lower surface.

12. An article of manufacture for connecting cylindrical objects having recessed end members, said article comprising:

a generally disk-shaped member, said disk-shaped member including a plurality of segments, said segments being internally connected and selected ones of said segments having their peripheral edges axially movable, said axially movable segments having upstanding ribs at their peripheries;

a threaded member projecting perpendicularly from one side of said disk-shaped member; and a spindle projecting perpendicularly to the other side of said disk-shaped member, the outer end of said spindle having means defining a threaded longitudinally extending bore adapted to receive the threaded member from a second such article.

13. An article of manufacture as set forth in claim 12 wherein the other of said segments having depending ribs at their peripheries.

14. An article of manufacture as set forth in claim 12 wherein said disk-shaped member is flexibly connected to said spindle by ribs to permit the molding of said disk-shaped member in a plane parallel to the axis of said spindle and said disk-shaped member being rotatable to the position perpendicular to said spindle.

* * * * *